(12) United States Patent
Sheridan (10) Patent No.: US 12,174,065 B2
(45) Date of Patent: Dec. 24, 2024

(54) ADAPTER FOR USE WITH A COLOUR MEASURING DEVICE, AND A METHOD AND SYSTEM THEREOF

(71) Applicant: Nix Sensor Ltd., Hamilton (CA)

(72) Inventor: Matthew Sheridan, Burlington (CA)

(73) Assignee: Nix Sensor Ltd., Hamilton (CA)

( * ) Notice: Subject to any disclaimer, the term of this patent is extended or adjusted under 35 U.S.C. 154(b) by 346 days.

(21) Appl. No.: 17/617,178

(22) PCT Filed: Jun. 1, 2020

(86) PCT No.: PCT/CA2020/050752
§ 371 (c)(1),
(2) Date: Dec. 7, 2021

(87) PCT Pub. No.: WO2020/248044
PCT Pub. Date: Dec. 17, 2020

(65) Prior Publication Data
US 2022/0316944 A1    Oct. 6, 2022

Related U.S. Application Data

(60) Provisional application No. 62/860,930, filed on Jun. 13, 2019.

(51) Int. Cl.
*G01J 3/02* (2006.01)
*G01J 3/50* (2006.01)

(52) U.S. Cl.
CPC .......... *G01J 3/0202* (2013.01); *G01J 3/0291* (2013.01); *G01J 3/50* (2013.01)

(58) Field of Classification Search
CPC ...... G01J 3/0202; G01J 3/0262; G01J 3/0267; G01J 3/0291; G01J 3/50
See application file for complete search history.

(56) References Cited

U.S. PATENT DOCUMENTS

| | | | |
|---|---|---|---|
| 5,272,518 A | 12/1993 | Vincent | |
| 6,234,688 B1* | 5/2001 | Boger | G02B 6/4292 |
| | | | 385/92 |
| 2017/0115209 A1* | 4/2017 | Sheridan | G01N 33/08 |

FOREIGN PATENT DOCUMENTS

| JP | 023134 B2 | 1/1990 |
|---|---|---|
| JP | 6503134 B1 | 3/2019 |

OTHER PUBLICATIONS

"PCT/CA2020/050752, International Preliminary Report on Patentability and Written Opinion mailed Dec. 23, 2021".
International Search Report and Written Opinion for PCT/CA2020/050752 dated Aug. 19, 2020.

* cited by examiner

*Primary Examiner* — Hina F Ayub
(74) *Attorney, Agent, or Firm* — Crowe & Dunlevy, P.C.

(57) ABSTRACT

An adaptor for use with a colour measuring device is provided where the colour measuring device has a cavity, a sensor positioned at a closed end of the cavity for measuring colour of a surface, and a rim surrounding an open end of the cavity. The adaptor includes a plate for contacting the surface and covering the rim of the colour measuring device, the plate having a portion for occluding the cavity that is transparent, referred to as the transparent portion, and a releasable coupling mechanism fixed to the plate for coupling the plate to the colour measuring device such that the transparent portion of the plate covers the sensor of the colour measuring device.

23 Claims, 9 Drawing Sheets

ADAPTER FOR USE WITH A COLOUR MEASURING DEVICE, AND A METHOD AND SYSTEM THEREOF

CROSS-REFERENCE TO RELATED APPLICATION

This application claims the benefits of priority to U.S. Provisional Patent Application No. 62/860,930, filed Jun. 13, 2019, titled ADAPTER FOR USE WITH A COLOUR MEASURING DEVICE, AND A METHOD AND SYSTEM THEREOF, the contents of which are hereby expressly incorporated into the present application by reference in their entirety.

FIELD OF THE INVENTION

The present concept relates to a device and a method for measuring and analysing colours and, more particularly, it relates to an adaptor for use with a colour measuring device.

BACKGROUND OF THE INVENTION

There are a number of prior art devices which have attempted to measure skin colour, each with shortcomings related to one or more of accuracy reproducibility, portability, cost of manufacture, and sanitation.

SUMMARY OF THE INVENTION

Forming one aspect of the present invention is an adaptor for use with a colour measuring device, the colour measuring device having a cavity, a sensor positioned at a closed end of the cavity for measuring colour of a surface, and a rim surrounding an open end of the cavity, the adaptor comprising:
  a plate for contacting the surface and covering the rim of the colour measuring device, the plate having a portion for occluding the cavity that is transparent, referred to as the transparent portion; and
  a releasable coupling mechanism fixed to the plate for coupling the plate to the colour measuring device such that the transparent portion of the plate covers the sensor of the colour measuring device.

Another aspect of the present invention is a method of measuring colour of a surface with a colour measuring device, the colour measuring device having a cavity, a sensor positioned at a closed end of the cavity for measuring colour of the surface, and a rim surrounding an open end of the cavity, the method comprising:
  contacting a plate of an adaptor to the surface, the plate having a portion that is transparent;
  releasably coupling the colour measuring device to the plate such that the transparent portion of the plate occludes the sensor and the rim of the colour measuring device; and
  engaging the colour measuring device to measure colour of the surface.

A further aspect of the present invention is a system for measuring colour of a surface, the system comprising:
  a colour measuring device having:
    a cavity,
    a sensor positioned at a closed end of the cavity for measuring colour of the surface,
    a rim surrounding an open end of the cavity, and
    a releasable coupling component, and
  an adaptor for use with the colour measuring device, the adaptor comprising:
    a plate for contacting the surface and covering the rim of the colour measuring device, the plate having a portion that is transparent for occluding the cavity, referred to as the transparent portion; and
    a corresponding coupling component fixed to the plate for coupling with the releasable coupling component of the colour sensing such that the transparent portion of the plate covers the sensor of the colour measuring device.

BRIEF DESCRIPTION OF THE DRAWINGS

The present will now be described by way of example only with reference to the following drawings in which.

DETAILED DESCRIPTION OF THE PREFERRED EMBODIMENTS

Referring to FIGS. 1-4, there is shown an example of a colour measuring device 100 or colorimeter in isolation. Colour measuring device 100 includes a single printed circuit board (PCB), battery, micro USB connector, first light pipe, second light pipe and a sensor (not shown). The colour measuring device 100 depicted also includes an upper housing 102 and a lower housing 104.

Lower housing 104 also includes a dust cover 106, light emitting ports 110 and a light aperture or cavity 112. Light enters through light emitting ports 110 from the first and second light pipes. Typically, a rim 114 that surrounds light aperture or cavity 112 is placed against a substrate or surface to be analysed for colour. Such surfaces may include a painted wall, skin, and a host of other surfaces and materials.

FIGS. 5-8 show an adaptor 10 according to an example embodiment of the present disclosure in isolation. Adaptor 10 is for use with colour measuring device 100. Adaptor generally includes a plate 12 and a releasable coupling mechanism 14.

Plate 12 has at least a portion 16 that is transparent, referred to as the transparent portion. In the depicted embodiment, the entire plate 12 is transparent, circular, substantially planar, and has as a diameter of about 3.8 cm.

Moreover, adaptor 10 may also be manufactured with inexpensive materials, allowing adaptor 10 to be disposable after each use.

Coupling mechanism 14 is a friction fit component fixed to plate 12 involving four tabs 18 that are fixed about the centre of plate 12 to transparent portion 16. In particular, tabs 18, as shown, are positioned on plate 12 in a geometrical arrangement that correspond with the shape of light aperture 112. Given the octagonal shape of light aperture 112, tabs 16 are also fixed to plate 12 in a correspondingly sized octagonal configuration. In this manner, coupling mechanism 14 is adapted to releasably couple plate 12 to colour measuring device 100 such that the transparent portion of plate 12 covers or occludes the sensor and light aperture/cavity 112.

Figure 1:
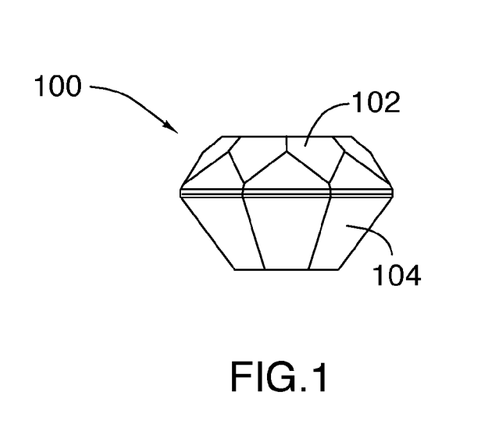
FIG. 1 is a side view of a colour measuring device in isolation.
Figure 2:
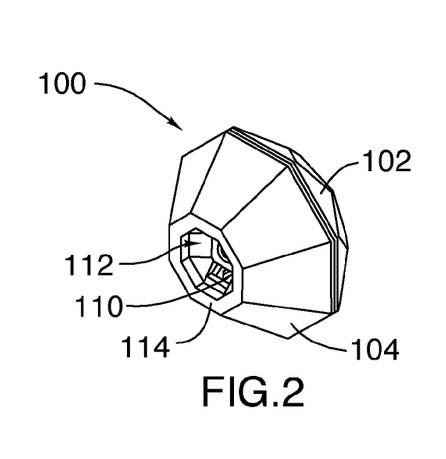
FIG. 2 is a bottom perspective view of the colour measuring device of FIG. 1.
Figure 3:
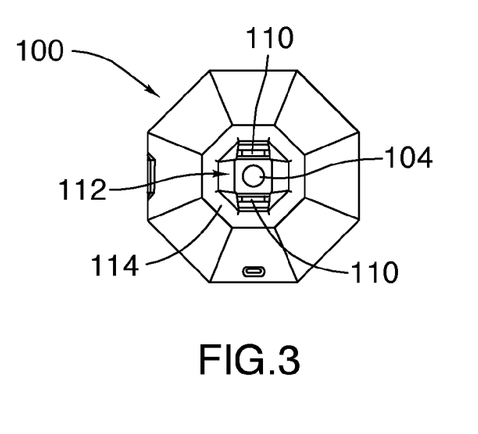
FIG. 3 is a bottom view of the colour measuring device of FIG. 1.
Figure 4:
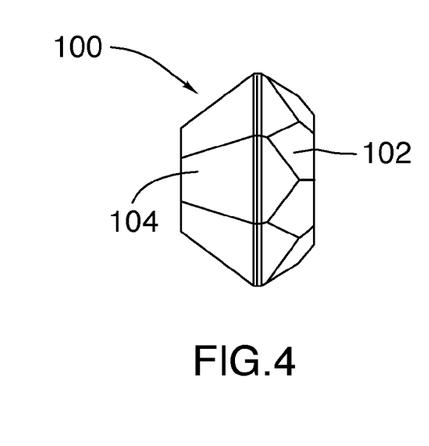
FIG. 4 is an alternate side view of the colour measuring device of FIG. 1.
Figures 5, 7:
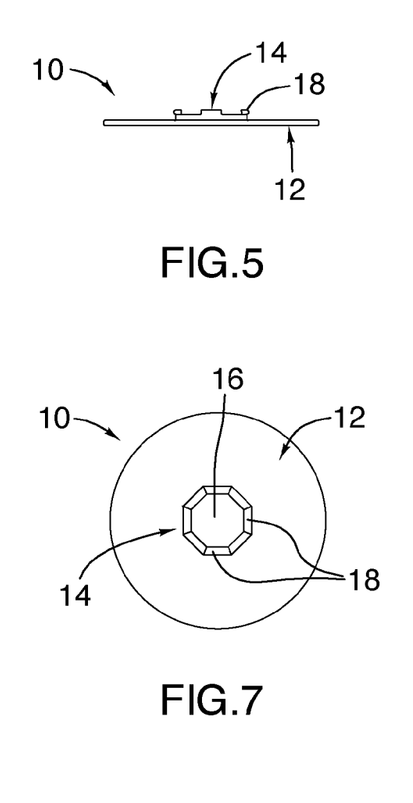
FIG. 5 is a side view of an adaptor according to an example embodiment of the present disclosure in isolation.
FIG. 7 is a bottom view of the adaptor of FIG. 5.
Figure 6:
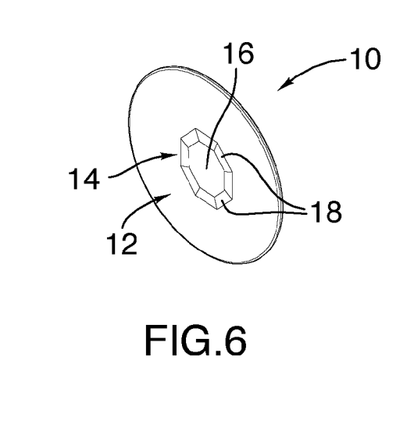
FIG. 6 is a bottom perspective view of the adaptor of FIG. 5.
Figure 8:
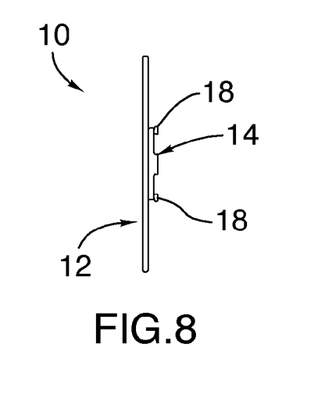
FIG. 8 is an alternate side view of the adaptor of FIG. 5.
Figure 9:
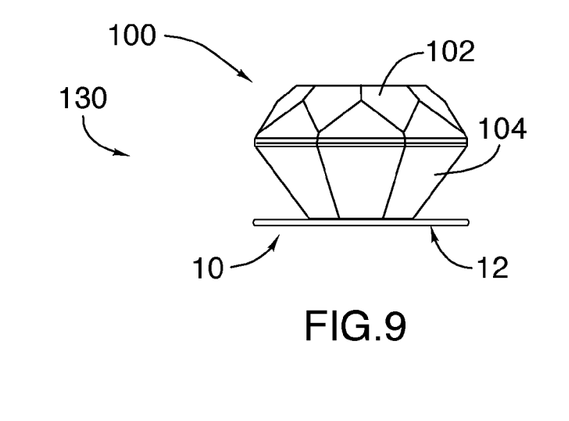
FIG. 9 is a side view of the adaptor of FIG. 5 coupled to the colour measuring device of FIG. 1.
Figure 10:
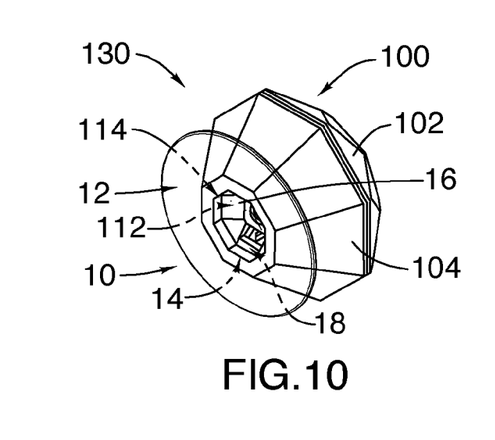
FIG. 10 is a bottom perspective view of the combination of FIG. 9.
Figure 11:
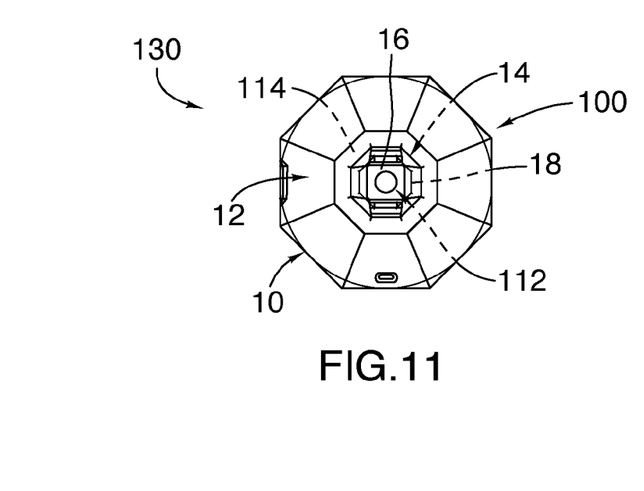
FIG. 11 is a bottom view of the combination of FIG. 9.
Figure 12:
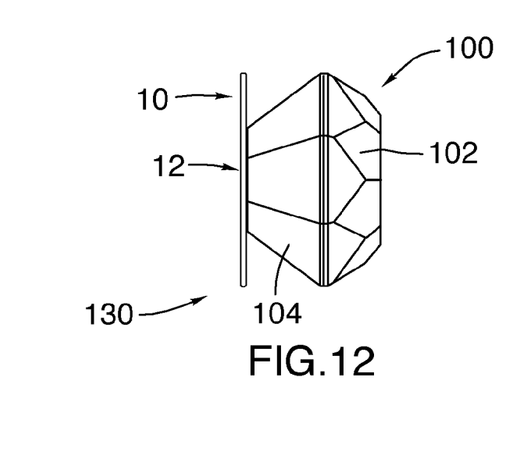
FIG. 12 is an alternate side view of the combination of FIG. 9.
Figure 13:
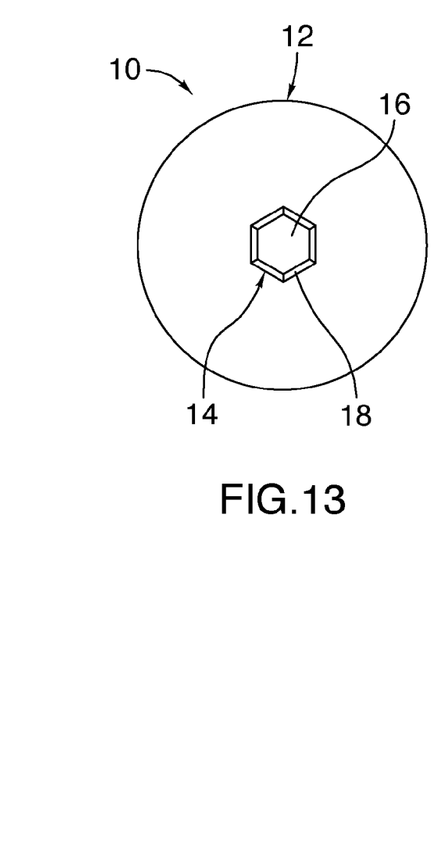
FIG. 13 is a bottom view of an adaptor according to a second example embodiment of the present disclosure in isolation.
Figure 14:
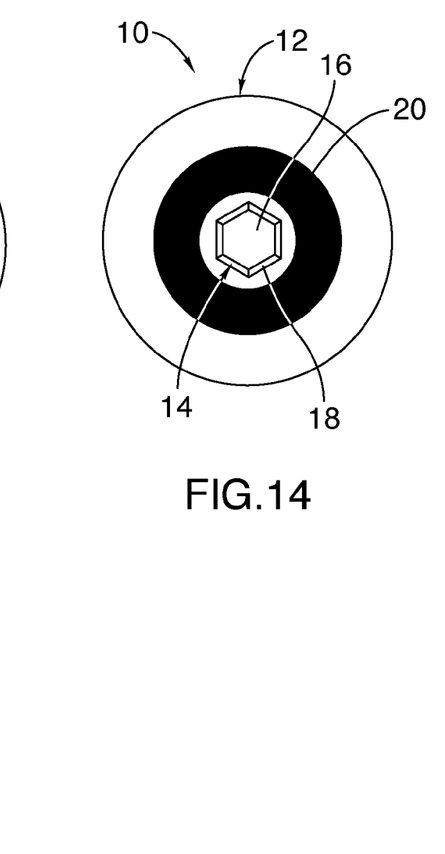
FIG. 14 is a bottom view of an adaptor according to a third example embodiment of the present disclosure in isolation.
Figure 15:
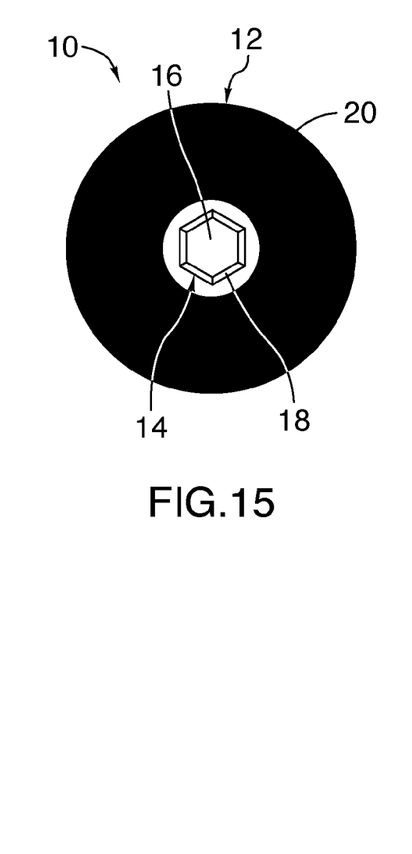
FIG. 15 is a bottom view of an adaptor according to a fourth example embodiment of the present disclosure in isolation.

FIGS. 13-15 also show adaptor 10 according to a second, third, and fourth example embodiment of the present disclosure. In each case, transparent portion 16 of the plate is positioned at the centre of the plate.

The embodiments shown in FIGS. 14-15, further include a portion 20 of plate 12 that is opaque, referred to as the opaque portion, where opaque portion 20 surrounds transparent portion 16. In FIG. 14, opaque portion 20 is geometrically concentric about transparent portion 16 with a 5 mm thickness. In FIG. 15, opaque portion 20 is geometrically concentric about transparent portion 16 with a 10 mm thickness, such that the entire plate 12 is opaque except for transparent portion 16.

Coupling mechanism 14 in FIGS. 13-15 is also a friction fit component fixed about the centre of plate 12. Unlike coupling mechanism 14 in FIGS. 5-8, coupling mechanism 14 in FIGS. 13-15 is arranged in a hexagonal shape.

While specific embodiments have been shown in FIGS. 5-8 and 13-15, variations are possible. For example, while coupling mechanism 14 may arranged in an octagonal or hexagonal arrangement, other geometrical arrangements are possible, such as a square or circle. Moreover, while friction fit components are shown, other mechanisms may be used to releasable secure plate 12 to colour measuring device 100, such as a snap-fit mechanism, a hook-and-loop fastener, or a magnetic fastener component etc.

In another example, while plate 12 of the above embodiments have a diameter of 3.8 cm, variations are possible where plate 12 is circular with a diameter of at least 1.8 cm, or preferable with a diameter of at least 2.7 cm.

In a further example, plate 12 may have a different shape other than a circular shape, including an oval shape, a rectangular shape or an irregular, non-symmetrical shape.

Adaptor 10 in combination with colour measuring device 100 may form a system 130 for sensing colour of a surface, depicted in FIGS. 9-12. System 130 includes colour measuring device 100 which has cavity 112, a sensor positioned at a closed end of cavity 112 for measuring the colour of the surface, and rim 114 surrounding an open end of cavity 112. Adaptor 10 of system 130 also includes a plate for contacting the surface and covering the rim of the colour measuring device, the plate having a portion that is transparent for occluding the cavity, referred to as the transparent portion.

Colour measuring device 100 of system 130 further includes a releasable coupling component and adaptor 10 further includes a corresponding coupling component fixed to plate 12 for coupling with the releasable coupling component of colour measuring device 100 such that transparent portion 16 of plate 12 covers the sensor of colour measuring device 100.

In an example embodiment, the releasable coupling component of adaptor 10 is a threaded portion and the corresponding coupling component of colour measuring device 100 is a correspondingly threaded portion for releasable engagement with the threaded portion of adaptor 10.

In an alternate embodiment, the coupling component of adaptor 10 is a male element of a snap-fit mechanism, such as a nub, and the corresponding coupling component is a female element of the snap-fit mechanism, such as a recess, for receiving the nub.

In use, adaptor 10 may be coupled to colour measuring device 100 also as shown in FIGS. 9-12 to measure the colour of a surface, including a pliable surface such as skin. In this manner, transparent portion 16 of plate 12 covers the sensor of colour measuring device 100 so that light may enter into light aperture 112.

Tabs 18 may be snapped into light aperture 112 such that plate 12 also covers rim 114. Accordingly, adaptor 10 covers rim 114 of colour measuring device 100 so that plate 12 can contact the surface, or skin, in use, rather than rim 114. Tabs 18 form a friction fit with the internal walls of the light cavity to hold adaptor 10 in place. In other words, tabs 18 may snap within cavity 112 of colour measuring device 100.

While one method of measuring the colour of a pliable surface is described, variations are possible. For example, plate 12 may be applied or pressed onto skin 120 prior to being releasably coupled to colour measuring device 100.

It was found that when colour measuring device 100 alone is placed on skin 120, the skin surface may be uneven or curved. The skin surface may also pucker when pressed against light aperture/cavity 112, causing the skin 120 to curve or "pillow" even if a curve was not previously present. Depending on the amount of downward pressure applied by the colour measuring device 100, the skin may pucker or "pillow" to different degrees (see FIG. 16 for example), which may cause the colour readings to vary wildly.

A number of other factors may also affect the colour read by a colour measuring device or a colorimeter when used on skin. Those other factors include "blanching", where the pressure applied by the colour measuring device temporarily blocks or closes blood vessels under the skin, thereby changing the observable colour of the skin in the vicinity of the colour measuring device. Depending on the amount of pressure applied by the colour measuring device 100, the skin may be "blanched" to different degrees. The colour and/or intensity of light used to illuminate the skin may also affect the colour reading by the colouring measuring device.

Colour measuring device 100 is designed and calibrated to measure flat surfaces at a generally 90 degree angle, so any curvature of the surface can cause colour readings to be inaccurate. In order to get an accurate and reproducible colour reading with compact portable colour measuring device 100, the surface to be sensed is, therefore, preferably flat or planar.

As well, when placed on skin, the skin may naturally impart oil, skin particles or other fragments on rim 114. Thus, most users would not wish to use compact portable colour measuring device 100 when it has been previously used on a different individual.

Thus, when plate 12 of adaptor 10, and thus colour measuring device 100, is pressed against a skin surface, plate 12 helps "flatten" the skin surface (see FIG. 14 for example) so light may be reflected off the skin surface and back up through dust cover 106 and on to the sensor. In this manner, a more accurate colour reading may be taken when compact portable colour measuring device 100 is engaged.

Due to the releasable nature of adaptor 10, adaptor 10 may also be removed from compact portable colour measuring device 100 and replaced with a different adaptor 10 when a different user wishes to use compact portable colour measuring device 100. This helps address hygienic or sanitary concerns the user may have regarding re-using colour measuring device 100.

The following studies demonstrate the above noted advantages of the present invention.

Study 1: Pillowing

Set-up: 14 synthetic skin samples (made of silicone) of varying skin tones were gathered. These skin samples were placed on a large tabletop scale (U-Line H-1651). A white sheet of paper was used as the interface between the skin samples and the metal surface of the scale. The scale was zeroed.

Measurement Procedure: A colour measurement of each of the 14 skin samples was taken once using colour measuring device 100 (a Nix Mini Color Sensor in this case) without adaptor 10 with approximately 50 g of downward force as read on the tabletop scale. CIE L*A*B* data from the colour measuring device was recorded. L*A*B* data expresses colour as three values: L* for the lightness from black (0) to white (100), A* from green (−) to red (+), and B* from blue (−) to yellow (+). CIELAB was designed so that the same amount of numerical change in these values generally corresponded to approximately the same amount of visually perceived colour change.

Figure 16:
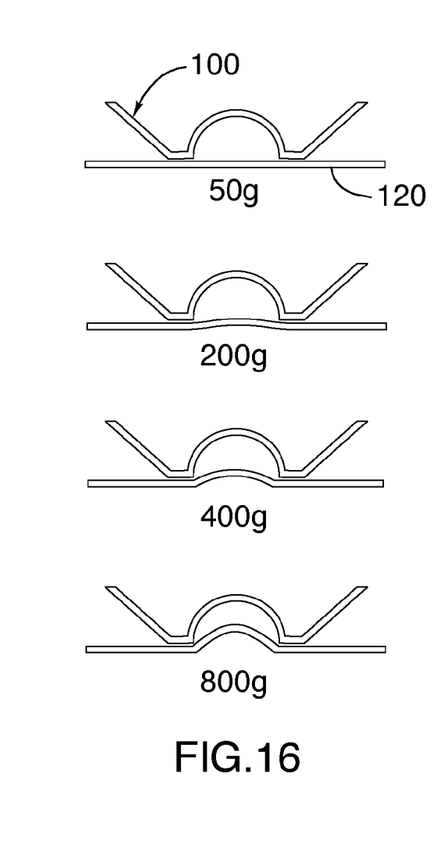
FIG. 16 is a schematic side view of the colour measuring device of FIG. 1 pressed on skin at different pressure levels without an adaptor.
Figure 17:
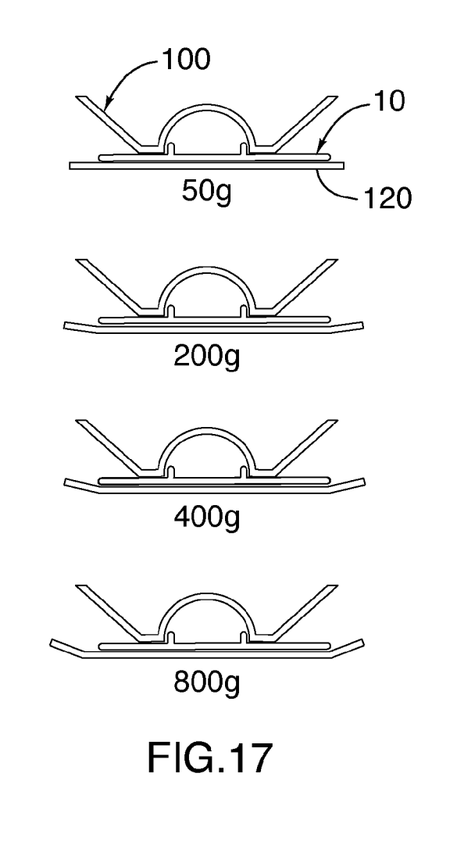
FIG. 17 is a schematic side view of the colour measuring device of FIG. 1 pressed on skin at different pressure levels with the adaptor of FIG. 5.

This was repeated with 200 g, 400 g, and 800 g of downward force (see FIG. 16). All four treatments (50 g, 200 g, 400 g, and 800 g) were performed again, this time with adaptor 10 attached to the aperture of the Nix Mini Colour Sensor (see FIG. 17).

50 g is an approximation of the least amount of downward force that it typically takes to ensure the Nix Mini Color Sensor makes complete contact with the skin sample. 50 g downward force was used as our baseline measurement. 200 g and 400 g are considered to be in the middle of the expected range of downward force for real-world skin measurement. 800 g is an approximation of the high-end of downward force likely to be exerted in a real-world scenario.

Analysis: The colour difference was calculated as the Euclidean distance within the CIE colour space, ΔE* or Delta E. Delta E (CIE2000) between 50 g vs. 200 g; 50 g vs. 400 g; and 50 g vs. 800 g was calculated for each of the 14 synthetic skin samples. The average Delta E for each of the above comparisons was calculated and the data set out in Tables 1 and 2 below and summarized in FIG. 15. When comparing any two colours, they are generally considered to be indistinguishable to the human eye when the Delta E value between them is less than 1 or 2.

Results: An increase in downward force—without a flat adaptor—was found to cause LAB values to shift toward a bright pink hue. This shift was quantified using the Delta E calculation. An average Delta E of 6.69, 14.99, and 27.39 (for 50 g vs. 200 g, 50 g vs. 400 g, and 50 g vs. 800 g, respectively) was calculated (Table 1). When using a flat adaptor, an average Delta E of 0.80, 0.75, and 2.09 was calculated (Table 2).

TABLE 1

Without Flat Adaptor

| Skin Tone | 50 g-200 g | 50 g-400 g | 50 g-800 g |
| --- | --- | --- | --- |
| A-1 | 7.43 | 15.45 | 23.35 |
| A-2 | 5.69 | 12.13 | 20.70 |
| A-3 | 6.92 | 13.97 | 22.76 |
| A-4 | 9.82 | 14.83 | 24.03 |
| A-5 | 7.40 | 14.20 | 24.57 |
| A-6 | 7.46 | 14.83 | 26.81 |
| A-7 | 7.04 | 17.01 | 29.14 |
| A-8 | 7.82 | 16.01 | 25.43 |
| A-9 | 6.80 | 12.71 | 25.43 |
| A-10 | 5.47 | 14.54 | 27.54 |
| A-11 | 5.86 | 12.68 | 29.19 |
| A-12 | 7.76 | 18.37 | 35.92 |
| A-13 | 3.30 | 10.58 | 27.94 |
| A-14 | 4.91 | 22.55 | 40.70 |
| Average DE | 6.69 | 14.99 | 27.39 |

TABLE 2

With Flat Adaptor

| Skin Tone | 50 g-200 g | 50 g-400 g | 50 g-800 g |
| --- | --- | --- | --- |
| A-1 | 1.40 | 1.12 | 2.20 |
| A-2 | 0.98 | 0.97 | 1.81 |
| A-3 | 1.11 | 1.37 | 1.83 |
| A-4 | 0.88 | 1.22 | 1.78 |
| A-5 | 0.65 | 0.76 | 1.42 |
| A-6 | 0.45 | 0.59 | 1.29 |
| A-7 | 0.41 | 0.28 | 1.43 |
| A-8 | 0.63 | 0.42 | 1.19 |
| A-9 | 0.97 | 1.00 | 1.88 |
| A-10 | 0.04 | 0.20 | 1.97 |
| A-11 | 0.32 | 0.53 | 1.94 |
| A-12 | 0.88 | 0.45 | 2.42 |
| A-13 | 1.38 | 0.17 | 3.98 |
| A-14 | 1.13 | 1.36 | 4.07 |
| Average DE | 0.80 | 0.75 | 2.09 |

Figure 18:
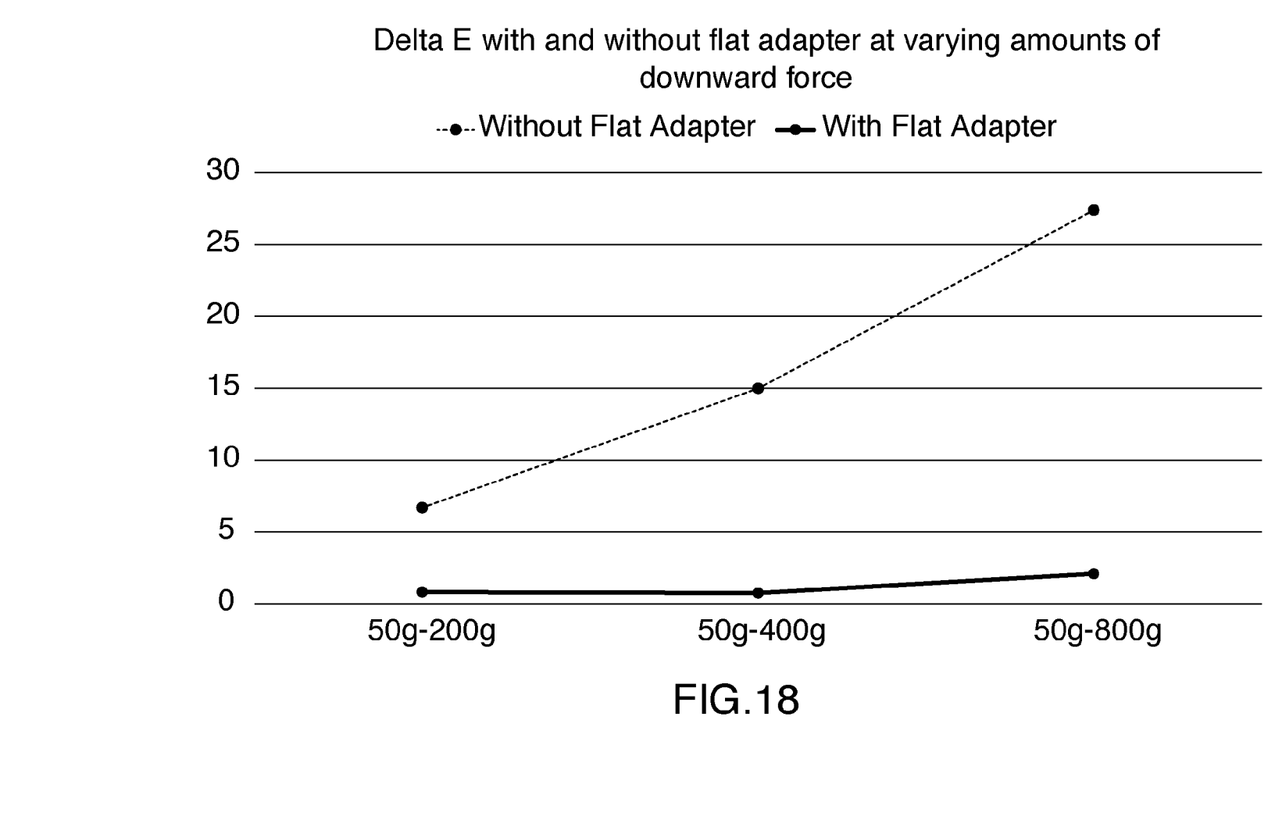
FIG. 18 is a line graph summarizing the data collected from Study 1.

FIG. 18 is a graph summarizing the Delta E values for each of the 14 skin samples when comparing LAB values between 50 g vs. 200 g; 50 g vs. 400 g; and 50 g vs. 800 g.

Conclusion: When collecting colorimetric data with a Nix Mini Colour Sensor, it was found that increased downward pressure on a soft surface such as skin causes colour readings to shift. When measuring without the use of adaptor 10, a downward force of as little as 200 g (which is considered the low-end of downward force that would be seen in the real-world) would cause a shift of around 7 Delta E. As noted above, two colours are generally considered indistinguishable to the human eye when the Delta E value between them is 2 or less. A Delta E value of 7 far exceeds this threshold, meaning the colour data is inconsistent. This inaccuracy is even greater when looking at 400 and 800 g downward forces.

However, when a flat adaptor was used, there was no perceptible colour shift (ΔE*<1) until the 800 g treatment, where this difference is almost imperceptible to the average human eye, where ΔE* was just over 2.

Based on the above, the skilled person may readily conclude that adaptor 10 prevents the skin from "pillowing" into the Nix Mini aperture. Without adaptor 10, skin is able to pillow into the Nix Mini Colour Sensor aperture, thereby altering the geometry of the measurement surface. This pillowing effect is more pronounced when downward force is increased. Adaptor 10, thus helps to ensure the geometry of the skin sample is generally the same each time, regardless of how firm the user chooses to press down on the device (see FIG. 17).

Study 2: Diameter Size

Set-up: Two circular flat adaptors were used. The first ("large") adaptor with a diameter of 3.8 cm, and the second ("small") adaptor with a diameter of 1.8 cm. These adaptors were attached to the aperture of a Nix Mini Colour Sensor colorimeter. 5 human test subjects were used.

Measurement Procedure: The left hand of each test subject was placed on a table top scale (U-Line H-1651) and zeroed. The left hand of each of the test subjects was measured (on the fleshy part between the thumb and pointer finger) once using a Nix Mini Colour Sensor with an attached "large" flat adaptor at approximately 50 g of downward force as read on the table top scale. L, A, B data was recorded. This was repeated with 200 g, 400 g, 600 g, 800 g, and 1000 g of downward force. All six treatments (50 g, 200 g, 400 g, 600 g, 800 g and 1000 g) were performed again—this time with the "small" flat adaptor attached to the Nix Mini Color Sensor.

The rationale for the six weights/forces were as follows. 50 g is an approximation of the least amount of downward force it typically takes to ensure the Nix Mini Color Sensor makes complete contact with the skin sample. 50 g downward force was used as our baseline measurement. 200 g, 400 g, 600 g, and 800 g are considered to be representative of the expected normal range of downward force for real-world skin measurement. 1000 g is an approximation of a downward force greater than the expected normal range of downward force for real-world skin measurement. At 1000 g, the measurement procedure begins to become uncomfortable and even painful, due to pressure on the skin.

Figure 19:
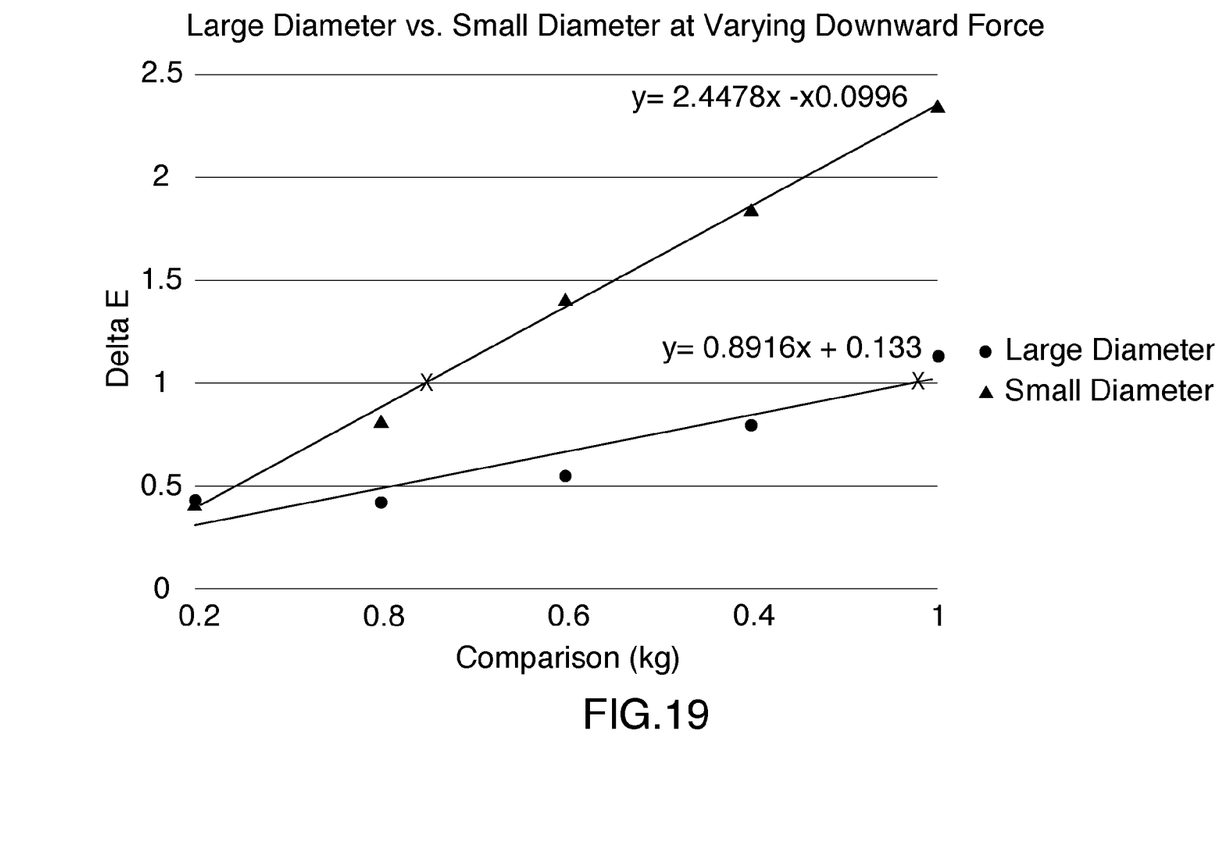
FIG. 19 is a line graph summarizing the data collected from Study 2.

Analysis: As before, the Delta E (CIE2000) between 50 g vs. 200 g; 50 g vs. 400 g; 50 g vs. 600 g; 50 g vs. 800 g; and 50 g vs. 1000 g was calculated for each human subject with each size of adaptor. The average Delta E for each of the above comparisons was calculated. The results are set out in Tables 3 and 4 (below) and summarized in FIG. 19.

TABLE 3

Average Delta E compared to the baseline 50 g for each downward force treatment. Large diameter flat adaptor

|  | Delta E (CIE2000) |
|---|---|
| 50 g vs. 200 g | 0.434 |
| 50 g vs. 400 g | 0.420 |
| 50 g vs. 600 g | 0.550 |
| 50 g vs. 800 g | 0.800 |
| 50 g vs. 1000 g | 1.135 |

TABLE 4

Average Delta E compared to the baseline 50 g for each downward force treatment. Large diameter flat adaptor

|  | Delta E (CIE2000) |
|---|---|
| 50 g vs. 200 g | 0.416 |
| 50 g vs. 400 g | 0.819 |
| 50 g vs. 600 g | 1.414 |
| 50 g vs. 800 g | 1.846 |
| 50 g vs. 1000 g | 2.350 |

Conclusion: The use of a large diameter flat adaptor produced more consistent colorimetric data across varying downward forces compared to a small diameter adaptor, especially at higher downward force. Since a Delta E of 1 between two colours is considered to be indistinguishable to the human eye, a Delta E of 1 was used as our "cut off". The data points from Table 3 and 4 were plotted to determine where the trend lines intersect at Delta E of 1. In FIG. 16, Red X's are used to represent the point where the trend lines intersect 1 Delta E When using a large diameter adaptor, it was found that a downward force of less than 972 g will produce results better than our cut-off of 1 Delta E. When using a small diameter adaptor, the downward force used is shown to be less 449 g to produce indistinguishable colour differences.

One can observe from the data that the large flat adaptor is capable of producing consistent colorimetric data throughout the entire range of the expected real-world downward forces, while the small flat adaptor is capable of producing consistent colorimetric data throughout only the lower range of the expected real-world downward forces For example, at a downward force of 800 g (the top of the expected real-world range of force) the large flat adaptor produces a Delta E of 0.800—well under the cut-off of 1—meaning a diameter of 3.6 cm is more than sufficient. For the small flat adaptor, the Delta E calculated was 1.846, which is greater than 1 but less than 2, which means the colour difference was close to indistinguishable.

This correlation between adaptor diameter and colorimetric consistency is likely due to a reduction in blanching—as diameter increases, the downward force is spread across more surface area which means blood flow under the skin is less impeded.

Figure 20:
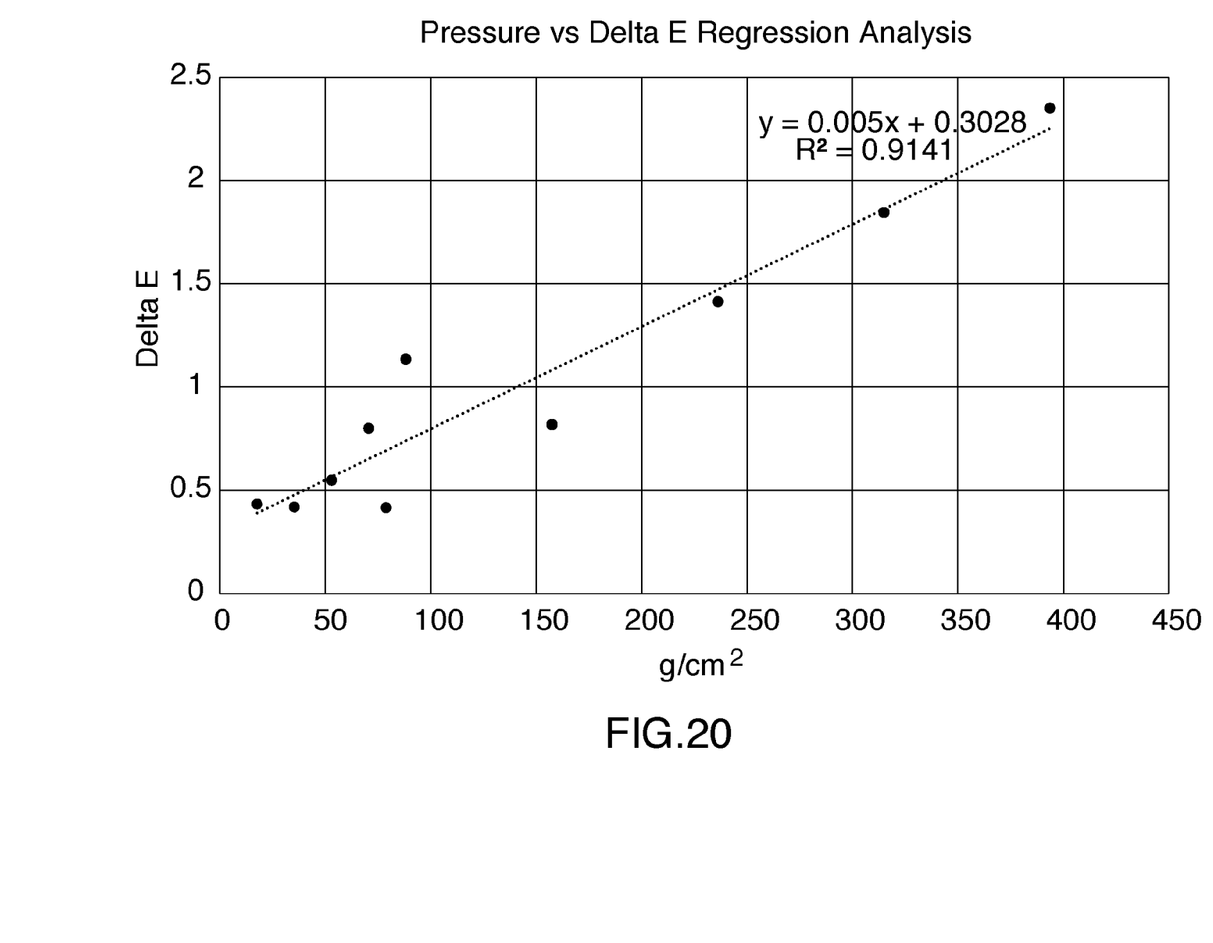
FIG. 20 is a regression analysis of the data collected from Study 2.

To determine the minimum diameter that the flat adaptor may be to ensure consistent readings across the range of downward pressures, the Delta E's from Table 3 and 4 were plotted against their corresponding $g/cm^2$ and a regression analysis was performed (see FIG. 20). It was found that the trend line intersects a Delta E of 1 at 139.44 $g/cm^2$. Then, using 800 g as the hypothetical high-end of real-world downward force, the theoretical minimum diameter that the flat adaptor may be while still ensuring a Delta E of less than 1 was calculated to be 2.70 cm.

An adaptor, thus, preferably has a diameter of at least 2.70 cm to allow for Delta E of less than 1. However, as understood by the skilled person, an adaptor having a diameter of less than 2.70 cm may be used to generate LAB colour data with somewhat indistinguishable colour differences, such as when the Delta E value between them is less 2, rather than less than 1.

Study 3: Light Conditions

Set-up: 14 synthetic skin samples (made of silicone) of varying skin tones were gathered and placed on a white sheet of paper. Three flat adaptors were prepared: 1) A clear flat adaptor with no coating (see FIG. 13); 2) A clear flat adaptor with a 5 mm ring of opaque black coating (about 50% of the diameter of the adaptor) (see FIG. 14); and 3) a flat adaptor 100% covered by opaque black coating (see FIG. 15).

Measurement Procedure: Each of the 14 skin samples was measured three times using a Nix Mini Colour Sensor with each of the three flat adaptors under two different conditions:
1) Low Light: lights off in a room with minimal light coming from covered windows
2) High Light: overhead lights on in the same room with a Greenlife LED lamp facing horizontally at each sample. This condition is meant to simulate the bright lights of a cosmetics store/salon.

Figure 21:
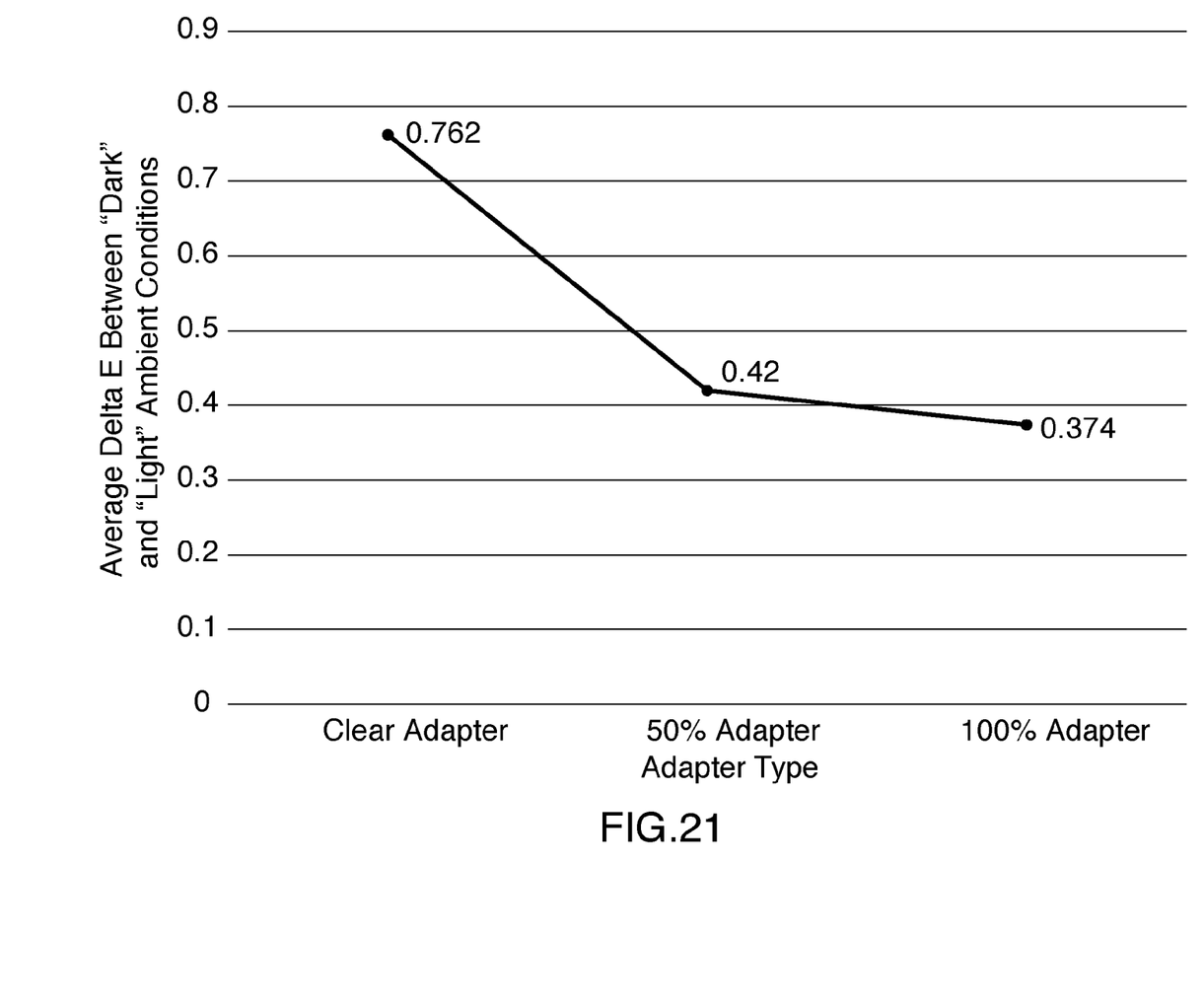
FIG. 21 is a line graph summarizing the data collected from Study 3.

Delta E (CIE2000) between Low Light and High Light conditions for each of the three flat adaptors was calculated for each of the 14 synthetic skin samples. The results are summarized in FIG. 21.

Conclusion: It was found that a wider (greater diameter) coating correlates to more consistent colorimetric measurements in varying light conditions. The average Delta E (colour difference) calculated with the 100% opaque adaptor was 0.374, which is less than the average Delta E calculated with the 50% opaque adaptor at 0.42. This in turn is less than the average Delta E calculated with the clear adaptor at 0.762.

It should be apparent to persons skilled in the arts that various modifications and adaptation of this structure described above are possible without departure from the spirit of the invention the scope of which defined in the appended claims.

The invention claimed is:

1. An adaptor for use with a colour measuring device, the colour measuring device having a cavity, a sensor positioned at a closed end of the cavity for measuring colour of a surface, and a rim surrounding an open end of the cavity, the adaptor comprising:
a plate for contacting the surface and covering the rim of the colour measuring device, the plate having a portion for occluding the cavity that is transparent, referred to as the transparent portion, wherein the plate has a diameter ranging from about 1.8 cm to about 3.8 cm; and
a releasable coupling mechanism fixed to the plate for coupling the plate to the colour measuring device such that the transparent portion of the plate covers the sensor of the colour measuring device.

2. The adaptor of claim 1, wherein the plate is substantially planar.

3. The adaptor of claim 2, wherein the plate is circular.

4. The adaptor of claim 1, wherein the plate has a diameter of 1.8 cm.

5. The adaptor of claim 1, wherein the plate has a diameter of about 3.8 cm.

6. The adaptor of claim 1, wherein the transparent portion of the plate is positioned at the centre of the plate.

7. The adaptor of claim 6, wherein the entire plate is transparent.

8. The adaptor of claim 7, wherein the coupling mechanism is fixed to the transparent portion of the plate.

9. The adaptor of claim 8, wherein the coupling mechanism is a friction fit component that snaps within the cavity of the colour measuring device.

10. The adaptor of claim 6, wherein the plate has a portion that is opaque, referred to as the opaque portion.

11. The adaptor of claim 10, wherein of the opaque portion surrounds the transparent portion of the plate.

12. The adaptor of claim 11, wherein the plate is opaque except for the transparent portion.

13. The adaptor of claim 1, wherein the plate has a diameter of 2.7 cm.

14. A method of measuring colour of a surface with a colour measuring device, the colour measuring device having a cavity, a sensor positioned at a closed end of the cavity for measuring colour of the surface, and a rim surrounding an open end of the cavity, the method comprising:
contacting a plate of an adaptor to the surface, the plate having a portion that is transparent, wherein the plate has a diameter ranging from about 1.8 cm to about 3.8 cm;
releasably coupling the colour measuring device to the plate such that the transparent portion of the plate occludes the sensor and the rim of the colour measuring device; and
engaging the colour measuring device to measure colour of the surface.

15. The method of claim 14, wherein the colour measuring device is releasably coupled to the adaptor prior to contacting the adaptor to the surface.

16. The method of claim 14, wherein the plate has a diameter of 2.7 cm.

17. A system for sensing colour of a surface, the system comprising:
a colour measuring device having:
a cavity,
a sensor positioned at a closed end of the cavity for measuring colour of the surface,
a rim surrounding an open end of the cavity, and
a releasable coupling component, and
an adaptor for use with the colour measuring device, the adaptor comprising:
a plate for contacting the surface and covering the rim of the colour measuring device, the plate having a portion that is transparent for occluding the cavity, referred to as the transparent portion, wherein the plate has a diameter ranging from 2.7 cm to about 3.8 cm; and
a corresponding coupling component fixed to the plate for coupling with the releasable coupling component of the colour measuring device such that the transparent portion of the plate covers the sensor of the colour measuring device.

18. The system of claim 17, wherein the plate is substantially planar.

19. The system of claim 18, wherein the plate has a diameter of 1.8 cm.

20. The system of claim 19, wherein the plate is opaque except for the transparent portion.

21. The system of claim 20, wherein the releasable coupling component of the colour measuring device is a threaded portion and the corresponding coupling component of the adaptor is a correspondingly threaded portion for releasable engagement with the threaded portion of the adaptor.

22. The system of claim 20, wherein the corresponding coupling component of the adaptor is a male element of a snap-fit mechanism, and the releasable coupling component is a female element of the snap-fit mechanism for releasable engagement with the male element.

23. The system of claim 17, wherein the plate has a diameter of 2.7 cm.

* * * * *